E. C. STARNES & E. C. WILLIS.
SEED AND GRAIN CLEANING MACHINE.
APPLICATION FILED DEC. 16, 1913.
1,176,869.
Patented Mar. 28, 1916.
2 SHEETS—SHEET 2.
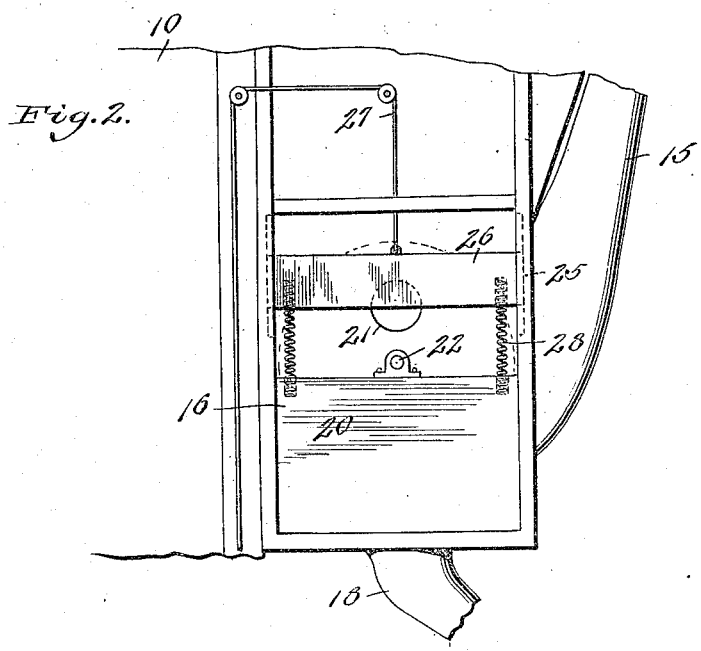
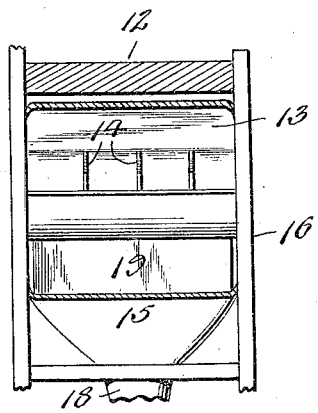
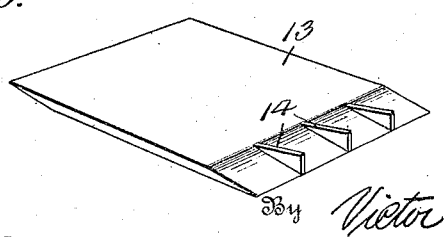
Witnesses
Inventors
E. C. Starnes and
E. C. Willis,
By Victor J. Evans
Attorney

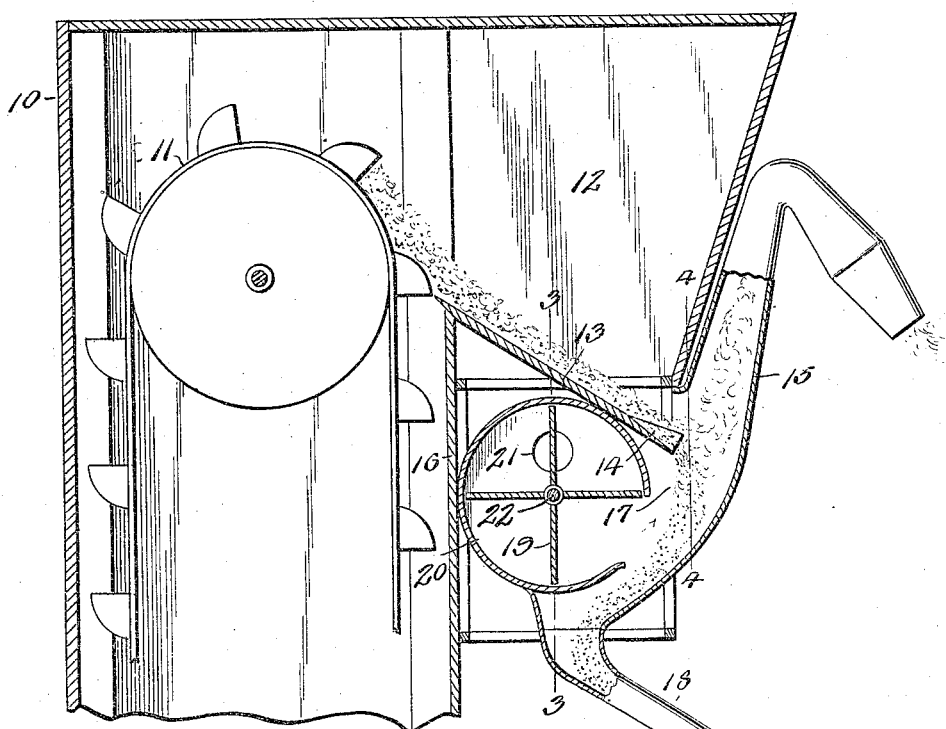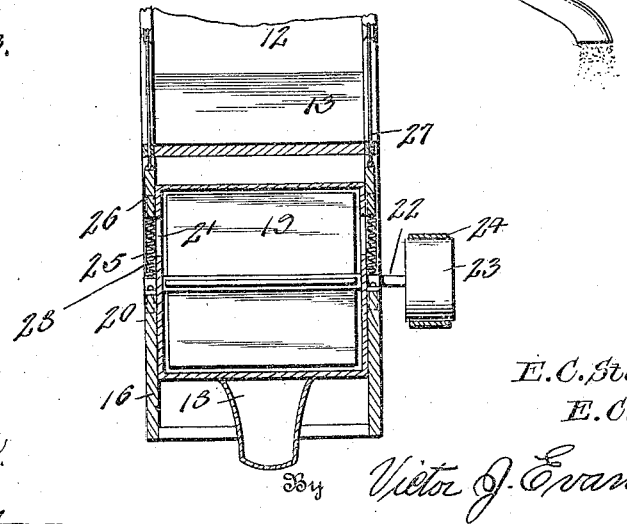

UNITED STATES PATENT OFFICE.

EARL C. STARNES AND EDWARD C. WILLIS, OF ALPHA, MINNESOTA.

SEED AND GRAIN CLEANING MACHINE.

1,176,869.  Specification of Letters Patent.  Patented Mar. 28, 1916.

Application filed December 16, 1913. Serial No. 807,107.

*To all whom it may concern:*

Be it known that we, EARL C. STARNES and EDWARD C. WILLIS, citizens of the United States, residing at Alpha, in the county of Jackson and State of Minnesota, have invented new and useful Improvements in Seed and Grain Cleaning Machines, of which the following is a specification.

An object of the invention is to provide a machine for use in connection with grain elevators or mills for the purpose of cleaning the grain and removing therefrom any dust or chaff.

The invention contemplates, among other features, the provision of a machine having a gravity grain feed and whereby the grain is divided into separate streams as it passes toward the distributing spout and which streams are subjected to the action of a blower fan in order to remove from the grain or seed any foreign matter, such as dust or chaff, the mentioned dust or chaff being adapted to be carried through a separate flue or passage and discharged into a suitable dust collecting receptacle.

In the further disclosure of the invention reference is to be had to the accompanying drawings, constituting a part of this specification, in which similar characters of reference denote corresponding parts in all the views, and in which:

Figure 1 is a vertical sectional view taken through our machine, showing the same in relation to a grain elevator; Fig. 2 is a fragmentary side elevation of the blower fan casing, showing the manner of admitting air thereto; Fig. 3 is a vertical transverse sectional view taken on the line 3—3 in Fig. 1; Fig. 4 is a vertical transverse sectional view taken on the line 4—4 in Fig. 1; and Fig. 5 is a perspective view of the inclined grain dividing plate.

Referring more particularly to the views, we disclose a housing 10 containing a suitable grain elevator 11 of any desired construction, and which is adapted to convey grain from a lower or working floor, not shown, into a hopper 12, the bottom of which is formed with an inclined grain dividing plate 13 provided at its lower front edge with a series of relatively spaced dividing members 14 in the nature of vertical plates and which, when the grain gravitates down the plate 13, are adapted to divide the grain into separate streams. An upwardly and forwardly inclined flue 15 is adapted to be connected by suitable piping with a dust collecting chamber, not shown, and the lower end of the plate 13 projects into the flue 15 at its inner end so that when the grain passes down the plate 13 it will be distributed into the inner end of the flue 15 in separate and distinct streams.

A casing 16 is supported on the housing 10 in any convenient manner and has an opening 17 communicating with the flue 15 at its inner end, the said flue being adapted to extend downwardly within the casing and terminate in a distributing spout 18. Journaled to rotate within the casing 16 is a blower fan 19 and formed in a side wall 20 of the casing is an intake opening 21, through which air is adapted to be supplied to the blower fan 19, the shaft 22 carrying the blower fan 19 and which is journaled to the casing, being adapted to have one end thereof extending exteriorly of the casing and provided with a suitable pulley 23 over which is adapted to operate a belt 24 having connection with a suitable driving mechanism, not shown, for imparting rotation to the fan.

Vertical guideways 25 are formed on the wall 20 of the casing 16 and on both sides of the intake opening 21 and a closure 26 for the intake opening 21 is mounted to slide on the guideways 25, the said closure 26 having connected thereto a suitable cable 27 and which extends to the lower working floor whereby the closure can be raised or lowered in order to open or close the intake opening 21, thus controlling the supply of air to the blower fan. In order to permit of easily operating the closure 26, the upper ends of a plurality of expansible helical springs 28 are preferably seated within the closure and have their other ends secured to the exterior of the wall 20 of the casing 16, the said springs being adapted to normally hold the closure in position to close the intake opening 21 and whereby when a pull is exerted on the cable 27 the closure will be operated against the action of the spring and thus can be readily raised or lowered the desired distance in order to accurately control the desired amount of air to the blower fan.

In the use of the device described, the grain is received in the inner end of the flue 15 in distinct and separate streams, as mentioned heretofore, and the grain is formed into these streams by the dividing member 14 carried by the plate 13. Now it will be readily apparent that by having the grain separated into streams as mentioned, when air is admitted into the casing containing the blower fan and the blower fan is operated, the currents of air will be driven into the flue 15 and, passing through the separate and distinct streams of grain, will remove therefrom all light and foreign matters such as dust and chaff and which foreign matters will be carried upwardly with the current of air, through the flue 15 and then distributed into the dust collecting chamber or receptacle mentioned heretofore, while the grain, after being cleaned as mentioned, will pass downwardly into the distributing spout 18 and from which it can be piped or suitably carried to various receptacles which are adapted to receive the same. It will be clearly seen that by dividing the stream of grain which passes over the plate 13 into a series of smaller streams, the current of air driven into the flue 15 can more readily act upon the smaller streams of grain in order to remove the foreign matter therefrom than if a single stream of grain were permitted to pass in front of the opening 17 of the casing 16, communicating with the flue 15, and through which the air is driven into the flue in order that it will properly act upon the grain passing in front of the opening.

Having thus described our invention, we claim:

In a device of the class described, a casing, a blower in the casing for forcing the air through openings in the opposite ends of the casing, vertical guide-ways formed on opposite sides of said casing, a closure, and a plurality of expansible helical springs seated within the closure and having their opposite ends secured to the exterior of the casing, said closure being walls of the casing, said closure being mounted in the vertical guide-ways, and means for operating the closure against the action of its springs for effecting the raising or lowering thereof to accurately control the desired amount of air into the blower fan.

In testimony whereof we affix our signatures in presence of two witnesses.

EARL C. STARNES.
EDWARD C. WILLIS.

Witnesses:
A. B. GEORGE,
W. S. ARIEMER.

Copies of this patent may be obtained for five cents each, by addressing the "Commissioner of Patents, Washington, D. C."